United States Patent [19]

Hecken

[11] 4,373,207
[45] Feb. 8, 1983

[54] SPACE DIVERSITY SIGNAL COMBINER

[75] Inventor: Rudolf P. Hecken, Andover, Mass.

[73] Assignee: Bell Telephone Laboratories, Incorporated, Murray Hill, N.J.

[21] Appl. No.: 217,567

[22] Filed: Dec. 17, 1980

[51] Int. Cl.³ .................................................. H04B 7/08
[52] U.S. Cl. ..................................... 455/139; 455/273; 455/12
[58] Field of Search .................... 455/10, 12, 134, 136, 455/137, 138, 139, 273, 276, 278, 279; 324/83 R, 77 A

[56] References Cited

U.S. PATENT DOCUMENTS

| 3,044,062 | 7/1962 | Katzin | 455/139 |
| 3,341,778 | 9/1967 | Dryden | 455/138 |
| 3,430,156 | 2/1969 | Katzin | 455/139 |
| 3,528,012 | 9/1970 | Kahn | 455/139 |
| 3,902,119 | 8/1975 | Skingley | 455/138 |
| 3,965,422 | 6/1976 | Tagliaferri | 455/138 |
| 4,160,952 | 7/1979 | Seastrand | . |

FOREIGN PATENT DOCUMENTS 1166792  2/1967  United Kingdom ................ 455/139
1379657  2/1973  United Kingdom ................ 455/138

OTHER PUBLICATIONS

A Correlation Audio Combiner for use with H. F. Diversity Receivers, by D. E. Susans, Communications 78-Conference on Communications Equipment and Systems, Birmingham, England (Apr. 4-7, 1978), pp. 286-288.

Primary Examiner—Tommy P. Chin
Attorney, Agent, or Firm—S. Sherman

[57] ABSTRACT

In a diversity signal combiner, the weaker of the two signals is attenuated an amount that varies as a function of the phase angle between the two signals. When the phase angle is small, the attenuation is small and the two signals add together. As the phase angle increases, the attenuation of the smaller of the two signals increases. For phase angles between 90 and 270 degrees, the contribution of the smaller signal is negligible. In digital systems, improvements in the bit error rate can be realized by introducing a 180 degree relative phase shift in the wavepath of the weaker signal whenever the phase angle exceeds a specified threshold.

3 Claims, 5 Drawing Figures

SPACE DIVERSITY SIGNAL COMBINER

TECHNICAL FIELD

This application relates to space diversity receivers and, in particular, to circuit arrangements for combining the two signals received in such systems.

BACKGROUND OF THE INVENTION

It is well known that radio waves, propagating from a transmitter to a receiver, can follow a plurality of different paths, and that the relative phases of the different waves arriving at the receiving antenna can be such as to destructively interfere, causing what is commonly referred to as a fade. In order to reduce the opportunity for this to occur, the so-called "space diversity" system has been developed using two, spaced antennas to feed a common or two separate receivers. The theory underlying the use of two spaced-apart antennas is that there is less likelihood that a fade will occur at both antennas at the same time. In the simplest system using a single receiver, means are provided to disconnect the receiver from one antenna as soon as the received signal level falls below a predetermined threshold and to connect the receiver to the second antenna. In this so-called "blind switching", it is assumed that the signal received by the second antenna is stronger than that received by the first antenna. In a more sophisticated system, the signals from the two antennas are combined instead of switching between them. This eliminates amplitude and phase jumps associated with the switching operation, and has the added advantage of delivering a larger amplitude signal to the receiver. However, such a system requires the use of dynamic phase correction to compensate for variations in the relative phase of the two signals caused by changes in the path lengths traversed by them. (See, for example, U.S. Pat. No. 4,160,952.)

A second difficulty resides in the manner in which the phase shifter control signal is derived. Typically, a small phase modulation is impressed upon the signal in one of the two antenna circuits. The phase modulation produces an amplitude modulation of the composite signal obtained when the two signals are combined. The fundamental second harmonic of this amplitude modulation is then detected by the receiver's AGC circuit and used to control the phase shifter. The problem with this approach is that it is often difficult to accurately detect the relatively small second harmonic component in the presence of noise.

In wideband radio systems, it has been found that amplitude and delay distortion from multipath fading can, under certain conditions, be a major cause of transmission deterioration. Means for detecting and compensating for this effect are disclosed in the copending application of H. Miedema, Ser. No. 158,404, filed June 11, 1980, and assigned to applicant's assignee. The process, which includes in-band equalization, can be involved and expensive.

SUMMARY OF THE INVENTION

A diversity signal combiner, in accordance with the present invention, neither seeks to track the relative phase of the received signals nor to detect and compensate for signal dispersion. Instead, the combiner examines the two received signals and simply combines them when they are favorably phased. As the phase angle between them increases, the combiner adjusts the signal gain in each of the two signal paths so as to attenuate the smaller of the two signals as a function of the relative phase angle between the signals. If the signals are in phase, the gain in each signal path is the same and the two signals are added together. If, however, there is a relative phase angle between the signals, the smaller of the two signals is attenuated an amount that is a function of the phase difference. For phase angles greater than 90 degrees and less than 270 degrees, the contribution of the smaller signal to the combined output is essentially nil.

While there is some loss of power involved in not seeking to combine the two signals under all conditions, the resulting power loss is small in comparison to the circuit simplification that accrues. Similarly, by minimizing the contribution of the smaller signal as a function of the phase angle, the potential for deep fades is eliminated without the need for rather complex detecting and compensating circuitry.

In a digital radio system, improvements in the bit error rate can be realized by combining the two signals over a larger range of phase conditions. This can be done by introducing a 180° relative phase shift in one of the signal path whenever the relative phase difference between the two received signals exceeds some specified amount. The effect of this is to increase the likelihood that the output signal is the combination of both received signals. However, to minimize amplitude and phase jumps, the phase control signals are advantageously synchronized with the attenuation control so that phase reversal is initiated in the channel which is attenuated, and only when the attenuation has exceeded a certain threshold.

DETAILED DESCRIPTION

Figure 1:
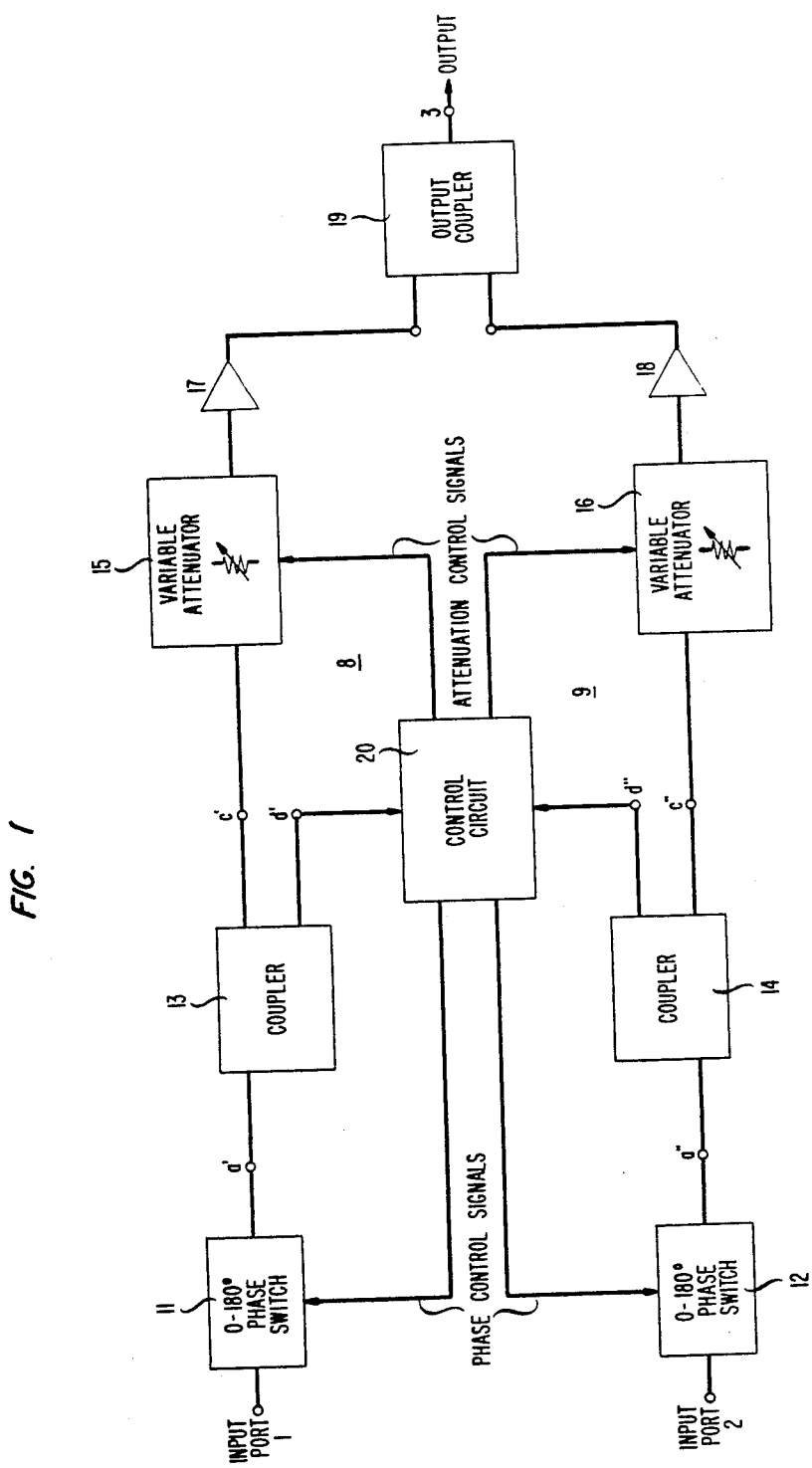
FIG. 1 shows, in block diagram, a signal combiner in accordance with the present invention.

Referring to the drawings, FIG. 1 shows, in block diagram, a signal combiner 10 in accordance with the present invention. The combiner comprises a pair of identical signal paths 8 and 9 for coupling input signals between input ports 1 and 2, respectively, and a common output port 3. Each path includes a 0°–180° phase switch 11, 12, a 3 dB coupler 13, 14, a variable attenuator 15, 16 and an amplifier 17, 18. Alternatively, a variable gain amplifier can be used instead of an amplifier with separate attenuator. The signals at the outputs of the amplifier are combined in an output coupler 19. For completeness, phase switches are included in the illustrative embodiment. However, this capability need not be included in all cases.

Attenuators 15 and 16, and phase switches 11 and 12 are controlled by signals derived from a control circuit 20. The latter responds to signal components coupled out of signal paths 8 and 9 by couplers 13 and 14. In particular, the control circuit measures the relative phase between the two input signals, and their relative magnitudes, and generates control signals as a function of these measurements.

In a space diversity receiver, the two received signals can be represented by A and $Be^{j\phi}$ where, because of propagation effects, the magnitudes A and B, and the relative phase $\phi$ between the two signals are basically independent variables. Therefore, it is possible for the combined signal $$V_o = A + Be^{j\phi} \tag{1}$$

to suffer strong attenuation whenever A and B are about equal in magnitude and the relative phase angle approaches 180°. To avoid this possibility, the combiner of FIG. 1 attenuates the weaker signal (or, when equal, the previously weaker signal) as a function of the relative phase angle $\phi$. In addition, a phase switch can be activated to reverse the phase in one of the signal paths whenever $\phi$ exceeds some preset value, i.e., 100°. The effect of this is to increase the output signal by combining components of both received signals. However, to minimize amplitude and phase jumps, the phase control signals are advantageously synchronized with the attenuation control so that phase reversal is initiated in the channel which is attenuated and only when the attenuation has exceeded a certain threshold. As noted above, the inclusion of the phase switches is an option which can be included, if required, to improve the performance in terms of lower bit error rates in digital radio systems.

The phase and magnitude information is obtained by coupling components of the signals in signal paths 8 and 9 to control circuit 20. This is accomplished by means of couplers 13 and 14.

Figure 2:
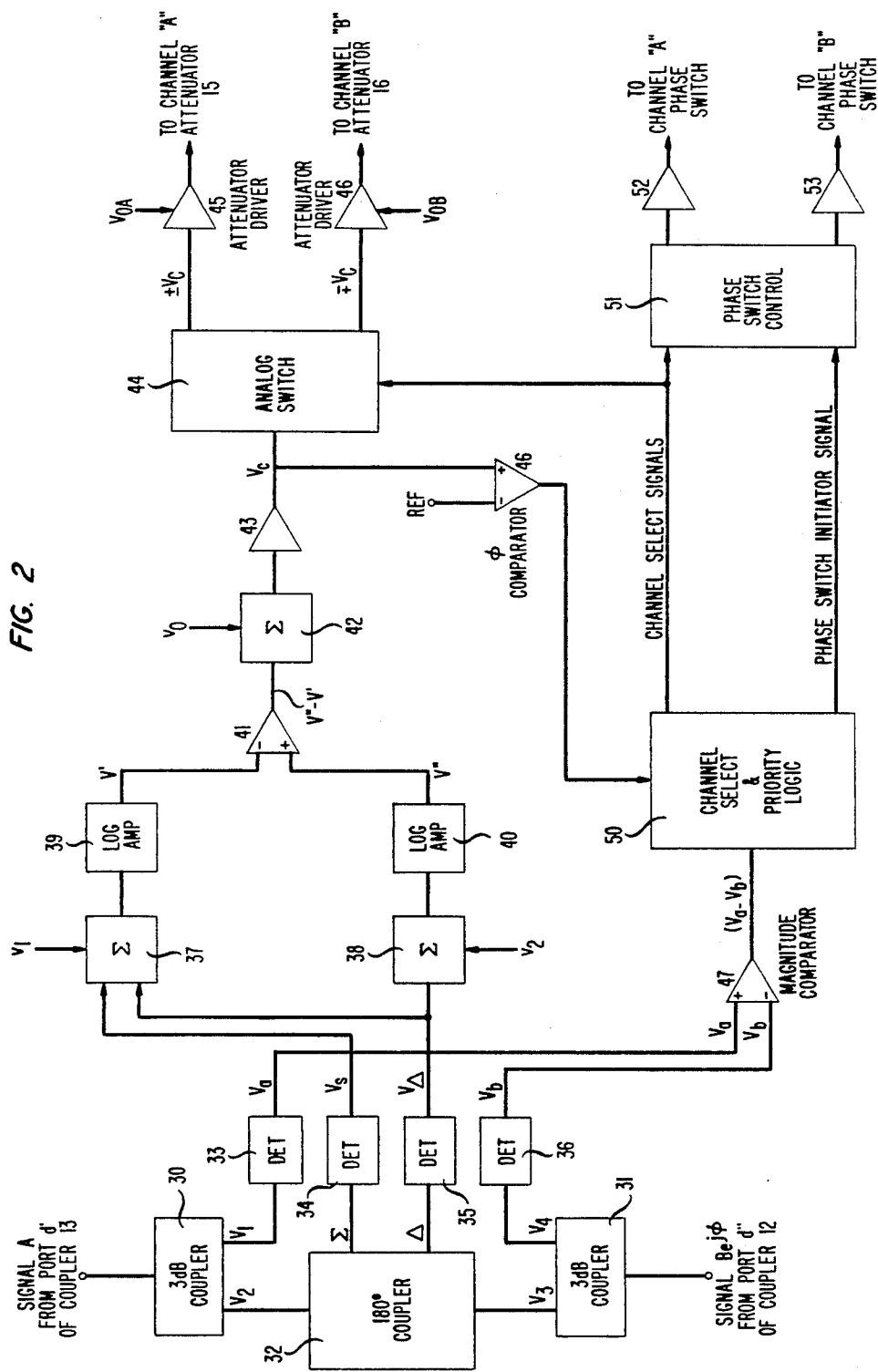
FIG. 2 is an illustrative embodiment of a control circuit for use with the invention.

FIG. 2, now to be considered, shows an illustrative embodiment of a control circuit for use with the present invention. In operation, signal components A and $Be^{j\phi}$, derived from couplers 13 and 14, are coupled, respectively, to 3 dB couplers 30 and 31 to produce output signals $V_1$, $V_2$, $V_3$ and $V_4$ whose magnitudes are given by $$V_1 = V_2 = A/\sqrt{2} \tag{2}$$

and $$V_3 = V_4 = Be^{j\phi}/\sqrt{2}. \tag{3}$$

Components $V_1$ and $V_4$ are coupled to square law detectors 33 and 34 to produce d.c. voltages $V_a$ and $V_b$ proportional to $A^2$ and $B^2$, respectively. Components $V_2$ and $V_3$ are coupled to a 180° coupler 32 to produce sum and difference signals $U_s$ and $U_\Delta$ given by $$U_s = V_2 + V_3 \tag{4}$$

and $$U_\Delta = V_2 - V_3. \tag{5}$$

After detection in detectors 34 and 35, d.c. voltages $V_s$ and $V_\Delta$ are obtained where $$V_s = k(A^2 + B^2 + 2AB \cos \phi), \tag{6}$$

$$V_\Delta = k(A^2 + B^2 - 2AB \cos \phi), \tag{7}$$

and k is a proportionality constant.

To obtain a suitable control signal, $V_s$ and $V_\Delta$ are added, and signal $V_\Delta$ is divided by this sum to yield $$V_{ci} = \frac{1}{2}\left(1 - \frac{2AB}{A^2 + B^2} \cos \phi\right). \tag{8}$$

Figure 3:
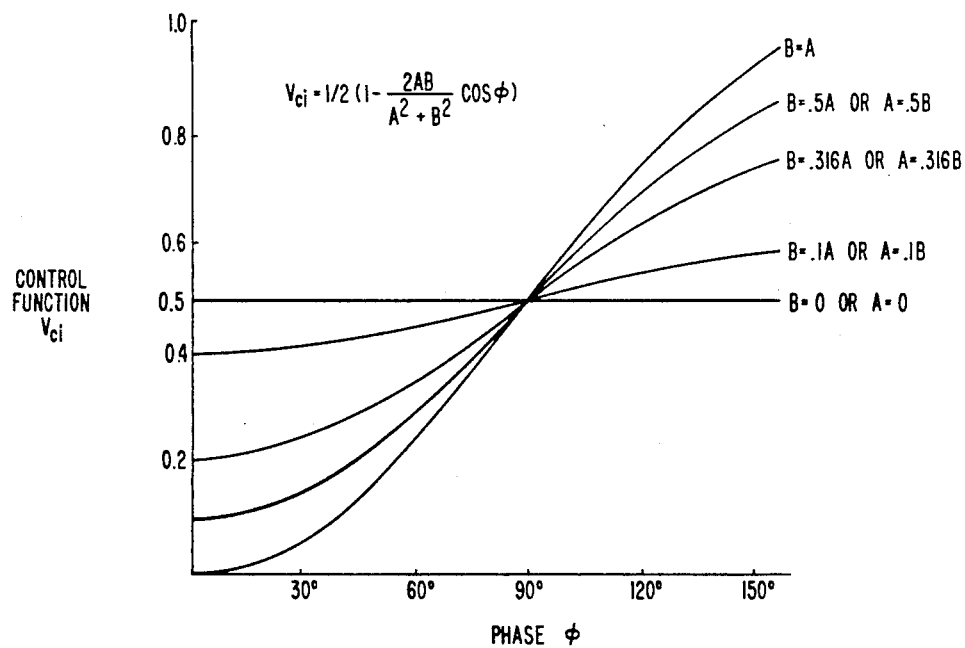
FIG. 3 is a graphical representation of the control signal employed to practice the invention.

FIG. 3 is a graphical representation of $V_{ci}$ as a function of $\phi$ for different combinations of A and B. As can be seen, when A or B is zero, $V_{ci}$ is equal to 0.5, and is independent of $\phi$. If the two received signals are in phase, i.e., $\phi = 0$, the control signal is also zero. If, on the other hand, the two signals are received out of phase, i.e., $\phi = 180°$, $V_{ci}$ is a maximum. Furthermore, the function is a monotonically increasing function and, as such, is well suited to control the attenuation as a function of the phase angle and, in addition, to determine the phase angle at which phase reversal shall take place.

To obtain the above-described control signal, signals $V_s$ and $V_\Delta$ are combined in a summing circuit 37. In order to keep the control voltage within practical limits, a small reference voltage $v_1$ is also added. The resulting sum is then passed through a logarithmic amplifier 39 to produce a first signal $V'$, where $$V' = k_1 \log (V_s + V_\Delta + v_1)^\alpha, \tag{9}$$

and $k_1$ and $\alpha$ are constants.

Similarly, a small voltage $v_2$ is added to $V_\Delta$ in a second summing circuit 38, and the resulting sum is passed through a second logarithmic amplifier 40 to produce a second signal $V''$, where $$V'' = k_1 \log (V_\Delta + v_2)^\alpha. \tag{10}$$

To obtain the desired ratio, signals $V''$ and $V'$ are applied to a differential amplifier 41, yielding a signal $\Delta V$ given by $$\Delta V = V'' - V' = k_1 \log \left(\frac{V_\Delta + v_2}{V_\Delta + V_s + v_1}\right)^\alpha. \tag{11}$$

Recognizing that the log of a number less than one is negative, an offset voltage $v_o$ is added to $\Delta V$ in summing circuit 42 to produce, at the output of buffer amplifier 43, a control signal $V_c$ given by $$V_c = v_o + k_1 \log \left(\frac{V_\Delta + v_2}{V_\Delta + V_s + v_1}\right)^\alpha. \tag{12}$$

Figure 4:
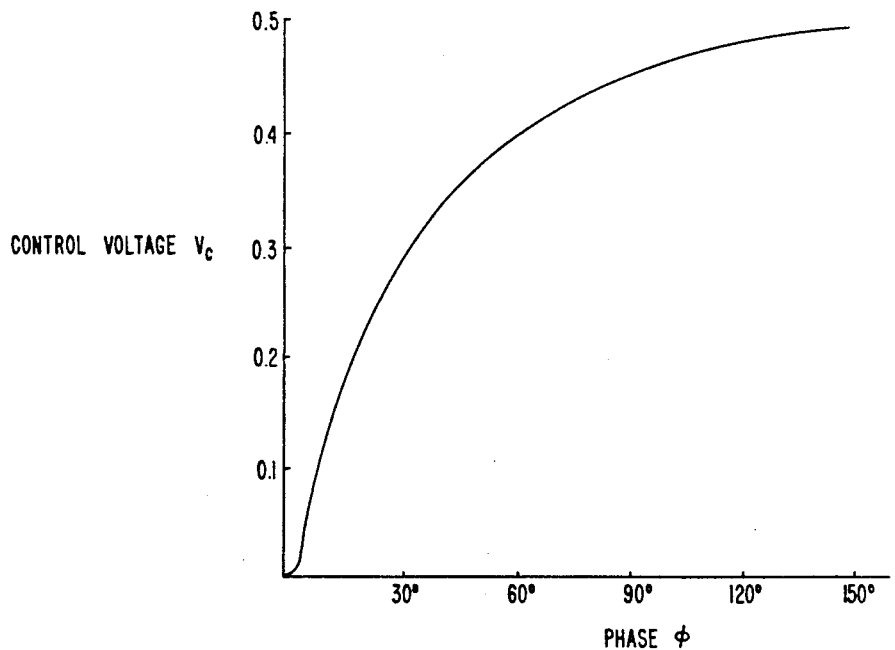
FIG. 4 shows the control signal characteristic as a function of phase angle.

The magnitude of $v_o$ is advantageously selected such that $V_c$ is always equal to or greater than zero. FIG. 4 shows the variations of $V_c$ as a function of phase angle. Any further processing of $V_c$ will depend upon the loss characteristic of the particular attenuators employed. Whatever the final characteristic the control signal is made to assume, it is coupled to analog switch 44, whose state is determined by a channel select signal derived from a channel select and priority logic circuit 50. The operation of the latter is explained in greater detail hereinbelow. The outputs from this switch are $\pm V_c$ and $\mp V_c$. That is, one branch is $+V_c$ when the other is $-V_c$. These signals are coupled to a pair of attenuator drivers 45 and 46 whose outputs control variable attenuators 15 and 16. By the appropriate selection of $k_1$ and the gain factor $\alpha$, the range of $V_c$ can be adjusted to closely match the attenuator characteristic.

As indicated hereinabove, the combiner operates to attenuate the smaller of the two signals. To determine which of the two signals is the smaller one, signals $V_a$ and $V_b$, derived from detectors 33 and 36, respectively, are compared in a comparator 47. Using a differential amplifier connected in the manner shown in FIG. 2, the comparator output, $V_a-V_b$, is positive if $V_a > V_b$ or negative if $V_a < V_b$.

If phase switches are not included in the combiner, the comparator output can be connected directly to the analog switch 44. In that case, the switch responds to attenuate the smaller signal, as explained hereinabove.

Figure 5:
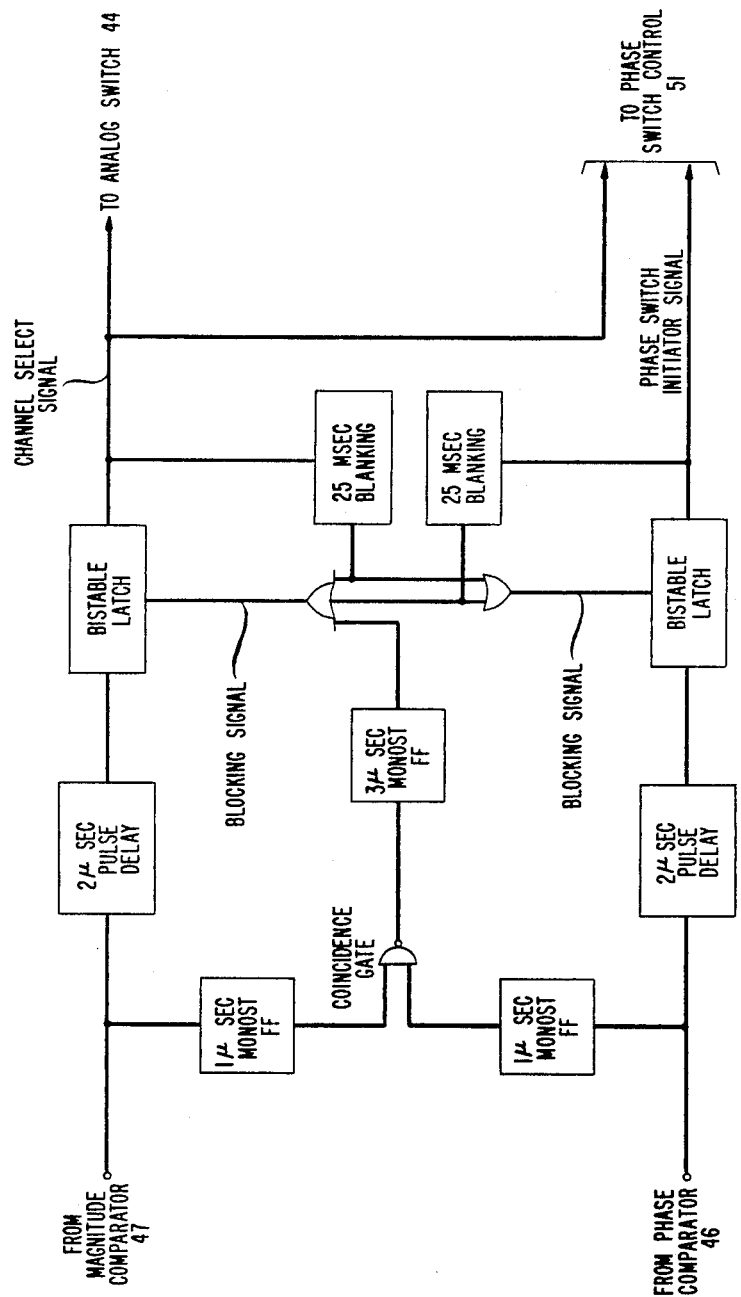
FIG. 5 is an illustrative channel select and priority logic circuit.

If phase switches are included in the combiner, the comparator output is coupled to a channel select and priority logic circuit 50 which also receives a phase change request signal from a phase comparator 46. As indicated hereinabove, the phase switch is activated when the relative phase between the two received signals exceeds some specified amount. This threshold is established by comparing $V_c$ to a reference signal. Whenever $V_c$, which is a function of $\phi$, exceeds the reference signal, a phase change request signal is generated and transmitted to circuit 50. The latter establishes the priority of the switching operations and determines the state of the phase and analog switches. For example, if a phase change request and an attenuation change request are received within a specified period of time (i.e., 1 $\mu$sec) of each other, the priority logic initiates the phase change first. If a phase change signal is derived from the $\phi$ comparator, a phase switch initiator signal is generated and applied to the phase switch control along with a channel select signal which determines which phase switch is to be activated. A simplified illustrative channel select and priority logic circuit is shown in FIG. 5.

What is claimed is:
1. A signal combiner 10 for combining two signals (A, $Be^{j\phi}$) whose magnitudes (A, B), and relative phase ($\phi$) are variable, comprising;
   first and second signal path (8, 9);
   control means (13, 14, 20) for sensing the magnitudes (A, B) and the relative phase ($\phi$) between the signals in said paths and for generating attenuation control signals in response thereto;
   attenuator means (15, 16) responsive to said attenuation control signals for causing the attenuation in the signal path handling the smaller of said two signals to vary as a function of said relative phase;
   and means (19) for combining the signals in said signal paths (8, 9) in a common output (3).
2. The combiner according to claim 1 wherein each of said signal paths (8, 9) includes a 180 degree phase switch (11, 12);
   and wherein said control signals generated by said control means (20) includes phase control signals for operating said phase switches.
3. The combiner according to claim 2 wherein said phase control signals cause the phase switch in the signal path handling the smaller of said two signals to switch whenever the relative phase ($\phi$) exceeds a specified threshold.

* * * * *